(No Model.)

F. C. GREENLEAF.
COMPENSATING PENDULUM.

No. 293,865. Patented Feb. 19, 1884.

Witnesses:
E. W. Johnson
L. C. Hills

Inventor:
Frank C. Greenleaf

Attorney

N. PETERS. Photo-Lithographer, Washington, D. C.

UNITED STATES PATENT OFFICE.

FRANK CHARLES GREENLEAF, OF APULIA, NEW YORK.

COMPENSATING PENDULUM.

SPECIFICATION forming part of Letters Patent No. 293,865, dated February 19, 1884.

Application filed April 5, 1883. (No model.)

*To all whom it may concern:*

Be it known that I, FRANK C. GREENLEAF, a citizen of the United States of America, residing at Apulia, in the county of Onondaga and State of New York, have invented certain new and useful Improvements in Pendulums; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in pendulum-regulators for clocks; and it consists in providing the end of a pendulum with a vertically-adjustable weight, which is supported or hung upon a thermostatic or compensating bar; also, in providing said pendulum-weight with means whereby the compensating-bar can be minutely adjusted, as will be hereinafter more fully set forth, and pointed out in the claims.

Figure 1:
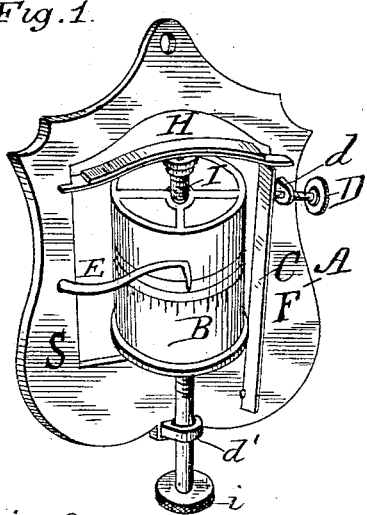
Figure 2:
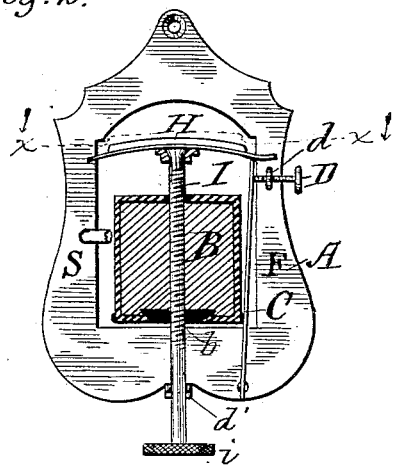
Figure 3:
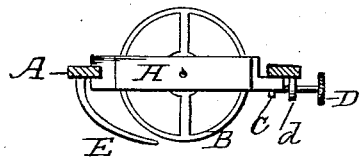

In the annexed drawings, which illustrate my invention, Figure 1 is a perspective view. Fig. 2 is a front view, partly in section; and Fig. 3 is a sectional view taken through the line *x x* of Fig. 2.

In the accompanying drawings, A represents a metallic frame, which has its inner central portion cut away, so as to provide an opening for the reception of an adjustable weight. This frame has formed on or attached to one side of the opening a projecting lug, *d*, which is perforated and screw-threaded for the reception of a set-screw, D. The upper portion of the frame is provided with means—as an eye—for attaching a pendulum to the pendulum-rod, and the lower end of the frame, at its central portion, is provided with an outwardly-projecting lug, *d'*, through which passes the smooth portion of the rod I, which rod is threaded on its upper portion, as shown, and forms a support for the bob or weight B. This weight or bob may be a cylinder of brass or other suitable metal, which is filled with lead, the ends of the casing being provided with openings through which the rod I passes. The lower portion of the casing is provided with a screw-threaded nut, *b*, which is held within the casing by means of the lead filling, and, if found desirable, the filling throughout its whole length may be provided with a female screw-thread for the reception of the threaded portion of the rod I. The outer surface of the weight or bob B has marked thereon suitable indexes—as rings and vertical lines suitably spaced—and the frame A has engraved thereon letters or words indicating in which direction to turn the weight or bob in order to accelerate or retard the motion of the pendulum. The frame is also provided with a pointer, E, which is bent so that its end will lie over the weight or bob, and will serve to indicate how much the weight has been turned, and will also act as a counter-balance for the parts attached to the opposite side of the frame.

To one of the vertical sides of the opening in the frame A, near its upper portion, is secured a thermostatic bar, H, one end of which is bifurcated and securely attached, by means of solder or otherwise, to the inner wall of the frame. This thermostatic bar, when straight, is of such a length that it will not abut against the opposite vertical side of the frame, and it is provided with a projecting tongue which extends beyond the central opening of the frame and over one of its sides. The thermostatic bar is of ordinary construction, and may consist of two metals or materials, which are of different expansibilities, and which are soldered or otherwise firmly affixed to each other throughout their whole length, the upper plate or portion of the bar being of less length than the lower portion. By reason of the different expansibility of the materials composing the thermostatic bar, heat will cause a warp or convexity on the side of the bar to which is attached the metal or material which is the most expansible. These bars of metal are secured to each other at a mean temperature, so that they will be straight or flat upon each other, and when there is any change of temperature it will cause the bar to bend in substantially the arc of a circle. When a bi-metallic thermostatic bar is employed, the most expansible of the two metals is placed uppermost. Upon the well-known and common construction of the thermostatic bar depends the operation of my invention.

To the central portion of the thermostatic bar H, and on its under side, is fixed or attached a socket or means for supporting the screw-threaded rod I, so that the same will be free to turn within said socket or supporting means, one form of socket being shown in Fig. 2 of the accompanying drawings.

To the frame A, on the side opposite the pointer E, near its base, is secured a spring or flat piece of metal, C, which projects at right angles from the side of the frame, and extends upwardly to a line about horizontal with the point to which the thermostatic bar is attached to the frame, so that the free end of the bar, which projects over the side of the frame, will rest upon the upper end of the spring C. This adjusting-spring is attached to the frame, so that it will be inclined away from the bob or weight, and it has a tendency to bear upon the set-screw D. The function of this screw is to make minute adjustments, and the spring, being rigidly attached to the lower part of the pendulum, will describe the arc of a circle, its highest point being when the same is adjusted so as to bring the spring immediately above the point of attachment to the frame, and its lowest point when it abuts against the lug $d$, which carries the set-screw D.

It will be evident that the weight of the bob B will cause the free end of the thermostatic bar to bear upon the end of the adjusting-spring.

The frame A, adjusting-spring C, pointer E, and lugs $d$ $d'$ should be constructed of the same metal or material, so that they will expand and contract in the same ratio or degree, and thus the adjustments will not be affected. The rod I, which is attached to the thermostatic bar H, is screw-threaded for a portion of its length, while its lower end is left smooth, and has attached thereto a holding piece or milled button, the weight of bob B being secured to the rod upon its screw-threaded portion, while the lower end of the rod, which is smooth, passes through an outwardly-projecting lug, $d'$, which serves to hold the rod I, which carries the weight, in a vertical position. The opening in the lug $d'$ is of such a size that the rod I may freely slide in the same. When it is desirable to adjust the weight either up or down vertically, the same may be held so as to prevent its turning and the rod I rotated; or the rod may be held stationary and the weight or bob turned. In either case the same result will be accomplished.

Having thus described the construction of my invention, so that its construction may be fully understood, I will now proceed to describe its operation, which is as follows: When it is desired to accelerate or retard the motion of the pendulum, the weight B is either raised or lowered, which may be accomplished by turning the weight and holding the rod stationary, or vice versa. By this operation the leading or main adjustments are made and the clock regulated approximately, and after this adjustment has been made an exact adjustment may be accomplished by turning the set-screw D, as when the same is turned so as to carry the end of the adjusting-spring toward the rod I the end of the thermostatic bar will be raised slightly, and when the set-screw is turned in an opposite direction the adjusting-spring will be allowed to move toward the lug, and thus form a lower support for the end of the thermostatic bar. The end of the lower plate of the bar H is bent so as to lie almost horizontal, and, as the upper plate is not attached over the same, will retain its position unaffected by the expansion of the upper plate. The purpose of this structure is that when by the expansion or contraction of the pendulum-rod, which is caused by changes of temperature, the rate of the swing of the pendulum is retarded or accelerated, the corresponding expansion of the thermostatic bar will raise or lower the bob or weight, and thus compensate for the change in length of the pendulum-rod, and so keep the motion equal; and the pendulum is provided with a novel isochronous means within itself for adjustment, compensating the effects of heat and cold. It will also be noticed that I provide two means for adjusting the bob—one by which the larger adjustment may be made, and the other for the minute adjustment.

Having thus described my invention, what I claim as new, and desire to secure by Letters Patent, is—

1. The frame A, provided with an adjustable weight suspended upon a thermostatic bearing, and adapted to be adjusted vertically, substantially as described, and for the purpose set forth.

2. In a pendulum-weight, the open frame A, provided at its upper end with a thermostatic bearing having a free end adjusting-spring, C, and vertically-adjustable weight B, substantially as shown, and for the purpose set forth.

3. In a pendulum-weight, an open frame having attached at its upper portion a thermostatic bar and means for vertically adjusting one end of the same, said thermostatic bar having depending therefrom a rod which carries an adjustable weight, the parts being combined substantially as shown, and for the purpose set forth.

4. In combination with the open frame having a thermostatic bar secured to one side within the frame, and at the opposite side of said frame a means for vertically adjusting the free end of the bar, a screw-threaded rod attached to the under side of the bar and passing through a guide on the lower part of the frame, and a pointer secured to the frame, the parts being organized substantially as shown, and for the purposes set forth.

5. In a compensating pendulum-weight, the thermostatic bar having a weight or bob carrying rod secured to the under side of the same, and a frame and means for attaching said frame to the pendulum-rod, for the purpose set forth.

6. In a compensating pendulum-weight, the open frame A, having rigidly secured at one side of the same a thermostatic bar provided at its under central portion with a partially screw-threaded rod, I, which carries a vertically-adjustable weight, the free end of the thermostatic bar being vertically adjustable by means of a spring, C, and set-screw, and a guide, $d'$, located near the base of the frame, and pointer E, attached to the frame opposite the spring C, the parts being organized and combined substantially as shown, and for the purpose set forth.

In testimony whereof I affix my signature in presence of two witnesses.

FRANK CHARLES GREENLEAF.

Witnesses:
J. H. WHEELOCK,
HIRAM W. GREENLEAF.